US012770468B2

(12) United States Patent
O'Neil et al.

(10) Patent No.: US 12,770,468 B2
(45) Date of Patent: Oct. 20, 2026

(54) STACKABLE LAYERS FOR MODIFICATION OF DEFAULT BEHAVIOR IN AN ITEM SELECTION PROCESS

(71) Applicant: Tether Games, Inc., Henderson, NV (US)

(72) Inventors: Aletheia Dione O'Neil, Henderson, NV (US); Gerald Timothy O'Neil, Henderson, NV (US)

(73) Assignee: Tether Games, Inc., Henderson, NV (US)

( * ) Notice: Subject to any disclaimer, the term of this patent is extended or adjusted under 35 U.S.C. 154(b) by 150 days.

(21) Appl. No.: 18/797,034

(22) Filed: Aug. 7, 2024

(65) Prior Publication Data

US 2025/0069478 A1 Feb. 27, 2025

Related U.S. Application Data

(60) Provisional application No. 63/578,062, filed on Aug. 22, 2023.

(51) Int. Cl.
*G07F 17/32* (2006.01)

(52) U.S. Cl.
CPC ................................ *G07F 17/3265* (2013.01)

(58) Field of Classification Search
None
See application file for complete search history.

(56) References Cited

U.S. PATENT DOCUMENTS

| | | | | |
|---|---|---|---|---|
| 6,251,013 | B1 * | 6/2001 | Bennett | G07F 17/3244 463/20 |
| 2004/0121836 | A1 | 6/2004 | Rudolph | |
| 2005/0192072 | A1 * | 9/2005 | Fiden | G07F 17/3262 463/16 |
| 2005/0282620 | A1 * | 12/2005 | Marks | G07F 17/3265 463/20 |
| 2006/0189377 | A1 * | 8/2006 | Gomez | G07F 17/3244 463/20 |
| 2008/0064465 | A1 * | 3/2008 | Bennett | G07F 17/34 463/16 |
| 2009/0124373 | A1 * | 5/2009 | Acres | G07F 17/32 463/25 |
| 2009/0137311 | A1 | 5/2009 | Iverson et al. | |

(Continued)

OTHER PUBLICATIONS

Balabanov, T. et al., "Slot Machine RTP Optimization and Symbols Wins Equalization with Discrete Differential Evolution," Large-Scale Scientific Computing: 10th International Conference, Jun. 2015, pp. 1-9.

(Continued)

*Primary Examiner* — Tramar Harper
(74) *Attorney, Agent, or Firm* — FENWICK & WEST LLP

(57) ABSTRACT

An item selection process uses layers to modify the default item selection process. The default selection process may select a one or more items using weighted or unweighted probabilities to select each item from a set of possible items. A layer is a data object that modifies how the items are selected, such as by modifying the probabilities or changing the possible items in the set from which one or more items are selected. The layer may impact only how a subset of the items are selected or may make different modifications to how each item is selected.

20 Claims, 5 Drawing Sheets

(56) References Cited

U.S. PATENT DOCUMENTS

| | | | | |
|---|---|---|---|---|
| 2010/0124969 | A1* | 5/2010 | Hughes | G07F 17/3213 463/20 |
| 2012/0214580 | A1* | 8/2012 | Hoffman | G07F 17/3225 463/42 |
| 2014/0121000 | A1 | 5/2014 | Porter | |
| 2014/0256402 | A1 | 9/2014 | Caputo et al. | |
| 2014/0274331 | A1 | 9/2014 | Fine et al. | |
| 2015/0087395 | A1* | 3/2015 | Baerlocher | G07F 17/34 463/20 |
| 2016/0005271 | A1 | 1/2016 | Vasquez et al. | |
| 2017/0358178 | A1 | 12/2017 | Berman | |
| 2017/0365127 | A1 | 12/2017 | Zoble et al. | |

OTHER PUBLICATIONS

PCT International Search Report and Written Opinion, PCT Application No. PCT/US2024/041356, Oct. 11, 2024, 14 pages.

* cited by examiner

FIG. 4
Default Reel
Behavior 410
Position 1
411
Position 2
412
Position 3
413
First Layer
420
First Position 1
Modifier
421
First Position 2
Modifier
422
First Position 3
Modifier
423
Second Layer
430
Second Position 1
Modifier
431
Second Position 2
Modifier
432
Second Position 3
Modifier
433
Modified Reel
Behavior 440
Modified Position 1
441
Modified Position 2
442
Modified Position 3
443

STACKABLE LAYERS FOR MODIFICATION OF DEFAULT BEHAVIOR IN AN ITEM SELECTION PROCESS

CROSS-REFERENCE TO RELATED APPLICATIONS

This application claims the benefit of U.S. Provisional Patent Application No. 63/578,062, filed Aug. 22, 2023, which is incorporated by reference.

BACKGROUND

1. Technical Field

The subject matter described relates generally to an item selection process driven by random or pseudo-random numbers and, in particular, to the use of stackable layers for modifying the default behavior of the selection process in a modular fashion.

2. Background Information

There are various scenarios in which one or more items from are selected from a set of possible items based on randomly or pseudo-randomly generated numbers. For example, in conventional slot machines, reels spin and then stop at one of a set of predetermined positions to display a symbol. The likelihood of a reel stopping at any given position may be weighted such that symbols resulting in a large payout are generally less likely to appear than those providing low or zero payout. A large amount of game theory research has been conducted on how to weight reels so that the resulting game has a good balance of excitement (typically driven by the feeling that a big win is close to happening) and game balance (meaning that payouts are large and regular enough for players to continue playing but not so large and regular that the machine loses money).

Similarly, digital slot machine games use a weighted randomization process to select items to be selected by virtual reels. Slot machines have also been developed that are stand-alone machines that include digital rather than physical reels. Numerous mobile games exist that provide the slot machine game mechanics to players on their smartphones and other mobile devices. The transition from physical reels to virtual machines opens possibilities for a wide range of mechanics that were not possible or exceedingly difficult to implement with physical reels. However, existing digital slot machines have thus far failed to take full advantage of these possibilities.

SUMMARY

An item selection process uses layers to modify the default item selection process. The default selection process may select one or more items using weighted or unweighted probabilities to select each item from a set of possible items. A layer is a data object that modifies how the items are selected, such as by modifying the probabilities or changing the possible items in the set from which one or more items are selected. The layer may impact only how a subset of the items are selected or may make different modifications to how each item is selected. For example. The layer may change the probabilities associated with which of the possible items is selected for a first item and add an additional possible item to the set from which a second item is selected.

In various embodiments, the item selection process is part of a slot machine game with a layer being a data object that includes a field for each position of one or more reels. The content of each field indicates how the symbol (i.e., item) or other properties of the corresponding position on a reel are modified by the layer. For example, one layer might change all of a first symbol into a second symbol while another layer might modify the weights of the positions on the reel (i.e., modify the probabilities that each position is selected when the reel is spun). One or more layers may be applied to reels during game play (e.g., as power ups earned during game play). The layers may include metadata indicating conditions under which the layer will be removed. The layers applied to a reel may be ordered in a hierarchy that governs the order in which the layers are applied and thus how conflicts between the layers are resolved.

The following disclosure describes embodiments in which the item selection process is part of a slot machine game in which layers are used to dynamically modify the behavior of reels. The slot machine game may be played as head-to-head matches between two or more players with synchronized reel spins. Thus, the outcome of the game is skill-based as the difference in outcomes for the different players is governed by their choices in how to apply layers (and potentially other power ups or tools), not the random or pseudo-random spins of the reels. However, in some embodiments, the use of layers or other reel modifiers may be used in other types of slot machine game, such as single player games of chance. Furthermore, in other embodiments, the item selection process may be used in other contexts where modifying how items are selected is desirable.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

EXAMPLE SYSTEMS

Figure 1:
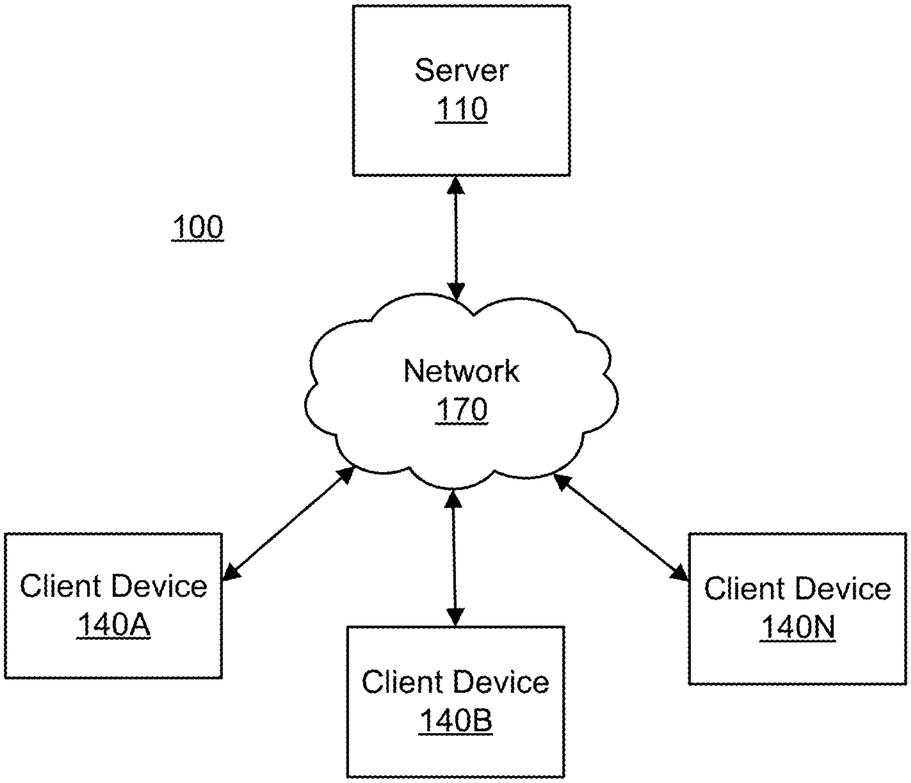
FIG. 1 is a block diagram of a networked computing environment suitable for providing an item selection process using layers that modify default behavior, according to one embodiment.

FIG. 1 illustrates one embodiment of a networked computing environment 100 suitable for providing an item selection process that uses layers to modify the default item-selection behavior. In the embodiment shown, the networked computing environment 100 includes a server 110 and multiple client devices 140. Although three client devices 140 are shown (a first client device 140A, a second client device 140B, and an Nth client device 140N), it should be appreciated that the networked computing environment 100 can include any number of such devices. In other embodiments, the networked computing environment 100 includes different or additional elements. In addition, the functions may be distributed among the elements in a different manner than described.

The server 110 is one or more computing devices that coordinates the item selection process. In various embodiments, the item selection process is used in matches of the slot machine game. The server 110 receives requests from client devices 140 of players to play a match, matches requests to form matchups, and synchronizes the instances of the slot machine game executing on each player' client device 140. The server 110 may also update player profiles based on gameplay during the match. For example, the server 1210 may assign a reward to the winning player, update gameplay statistics (e.g., win and loss ratios) of the players, or update achievements earned by the players, etc. Various embodiments of the server 110 are described in greater detail below, with reference to FIG. 2.

A client device 140 is a computing device with which a player can participate in the slot machine game. The client device 140 can be a smartphone, laptop, desktop, tablet, or other personal computing device. Alternatively, the client device 140 may be a dedicated gaming machine (e.g., in a gaming arcade or casino). In one embodiment, the client device 140 provides a user interface (e.g., in a dedicated game app or web browser) with which the player can request a match. On receiving a matchup identifying one or more other players (e.g., from the server 110) and game synchronization information, the client device 140 begins the slot machine game. The user plays the game using the client device 140 by initiating spins of a set of reels and choosing modifiers/power ups to apply. At the end of the game, the player may be awarded one or more rewards based on the result of the game. Rewards by be virtual rewards, such as ranking points or virtual objects for display within the game or correspond to real-world rewards, such as entitling the player to claim cash or a physical prize. Various embodiments of client device 140 are described in greater detail below, with reference to FIG. 3.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, some or all of the communication links of the network 170 may be encrypted using any suitable technique or techniques.

Figure 2:
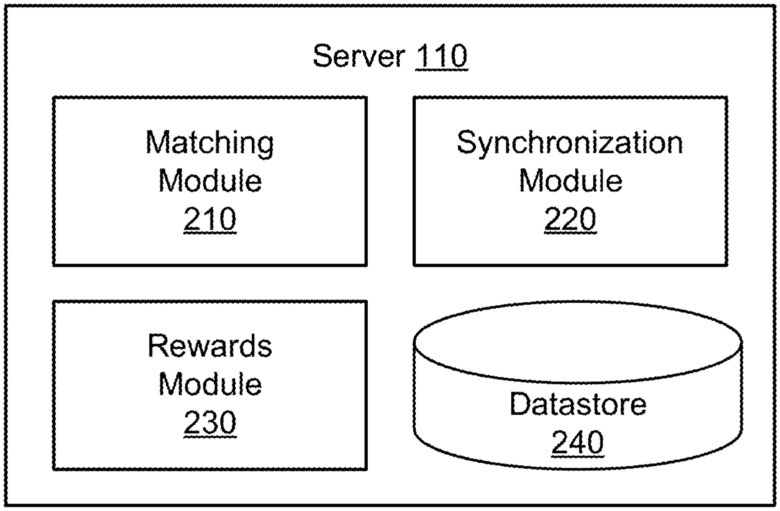
FIG. 2 is a block diagram of the server of FIG. 1, according to one embodiment.

FIG. 2 illustrates one embodiment of the server 110 that uses the item selection process in a slot machine game. In the embodiment shown, the server 110 includes a matching module 210, a synchronization module 220, a rewards module 230, and a datastore 240. In other embodiments, the server 110 includes different or additional elements. In addition, the functions may be distributed among the elements in a different manner than described. For example, rather than providing synchronization information to the client devices 140, the server 110 may determine the results of spins itself and provide the results of those spins to the client devices 140.

The matching module 210 groups players together to compete in matches of the slot machine game. In one embodiment, the matching module 210 receives requests initiated by players for matches (e.g., from client devices 140) and selects pairs of players to compete against each other in a match. On receiving a request from a first player, the matching module 210 may retrieve information about the player (e.g., from a player profile stored in the datastore 240) and pair the first player with a second player that has similar player information. Player information may include metrics indicating the skill level of the player (e.g., win-loss record, a weighted skill score based on wins and losses and the skill level of the other players involved in those wins and losses, average score achieved, etc.), demographic information about the player, and/or a location of the player, etc. For example, the matching module 210 may pair players that have similar skill levels according to one or more skill level metrics to provide a challenging and engaging match for both players.

The synchronization module 220 synchronizes the game experience for all players participating in a match. In one embodiment, the synchronization module 220 provides an ordered set of random or pseudorandom numbers to the client device 140 of each player. Alternatively, the synchronization module 220 may provide the same seed to each client device 140 and a random or pseudorandom number generator on each client device 140 uses the seed to generate the same set of numbers as are generated by the other client devices using the seed. Each client device 140 then uses the ordered set of random numbers to drive gameplay (e.g., to determine the results of each spin of the reels) such that, if the players each made the same decisions in the game, they would experience identical gameplay. Thus, the results of the game are not driven by the random chance of the random numbers generated but rather by the decisions made by each player.

In some embodiments, the synchronization module 220 provides more than one set of ordered random numbers to the client devices 140 of the players. This can provide an improved and more balanced experience in various circumstances. For example, a first set of random numbers may be used to determine the results of spins in the game rounds of the main game. When a player triggers a bonus round or bonus spin, a second set of random numbers may be used to determine the results. Thus, regardless of when players trigger the bonus round or spin, the results of spins in main game will remain synchronized between players. It should be appreciated that, depending on the specific game design, there may be many different functions within the game for which it is advantageous to synchronize sets of random numbers across the client devices 140 of the players.

As the game progresses, the players make use of various tools and power ups to modify the behavior of the reels, as described in greater detail below with reference to FIG. 3. Thus, although the random numbers used to determine the results of spins are synchronized between players, the ultimate score earned by each player will depend on the effectiveness of their application of the tools and power ups. At the end of the game, the player who made the best use of the available tools and power ups will have the highest score and thus win the game.

The rewards module 230 issues rewards to players for their performances in matches. Rewards may be issued to players by adding identifiers of the rewards earned to the player's profile (e.g., as stored in the datastore 240). In one embodiment, each player in a match pays virtual currency to enter the match and the rewards module 230 assigns the entrance fees of all players to the winner. Additionally or alternatively, players may be given other rewards for achieving various tasks, such as badges for completing a certain number of matches, having a winning streak of a predetermined length, beating a player ranked a certain amount above them, and the like. It should be appreciated that a wide range of reward distribution methods can be implemented depending on the specifics of the game design and the number of players involved in the match. Furthermore, some or all of the rewards may be exchanged by the player for real world currency.

The datastore 240 is one or more non-transitory computer-readable media that store data used by the other components of the server 110. For example, the datastore 240 can store player profiles, payout tables for games, and identifiers and conditions for earning other rewards, etc. Although the datastore 240 is shown as a single component within the server 110, the data may be stored across multiple storage media, some or all of which may be located remotely from the server 110 (e.g., as part of a distributed database).

Figure 3:
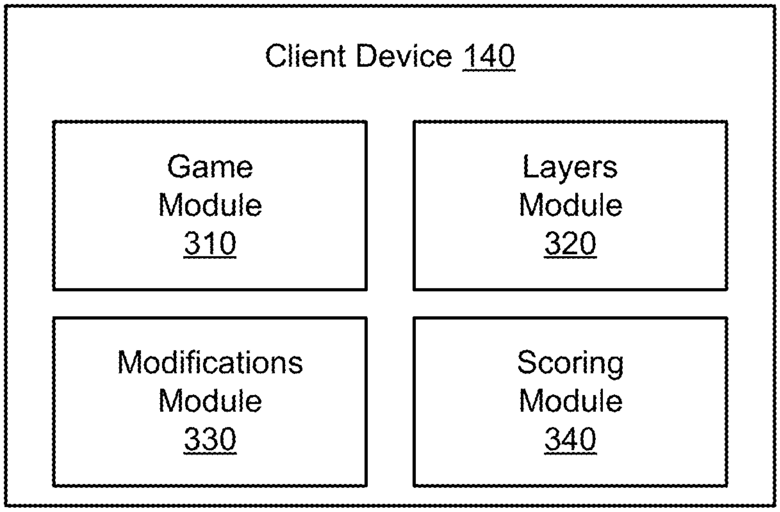
FIG. 3 is a block diagram of a client device of FIG. 1, according to one embodiment.

FIG. 3 illustrates one embodiment of a client device 140. In the embodiment shown, the client device 140 includes a game module 310, a layers module 320, a modifications module 330, and a scoring module 340. In other embodiments, the client device 140 includes different or additional elements. In addition, the functions may be distributed among the elements in a different manner than described.

The game module 310 provides the basic mechanics of the slot machine game. The game round module 310 causes the user interface of the slot machine game to be displayed on a screen of or connected to the client device 140. In one embodiment, the user interface includes a visual representation of a set of reels and a button to trigger the next spin the reels. The user interface may also include controls for applying and controlling the various layers and other modifications provided by the layers module 320 and modifications module 330, respectively. When the player triggers the button to spin the reel, the game module 310 obtains the next random or pseudorandom number in the set of numbers being used for synchronization set (e.g., as provided by the synchronization module 220) and applies the obtained number to select a position of the reel using the reel weights. For example, if the random number is an integer between one and ten and the reel has six positions with weights of 0.2, 0.2, 0.2, 0.2, 0.1, and 0.1, then if the random number is one or two, the first position is selected, if the random number is three or four, the second position is selected, etc., all the way up to if the random number is ten, the sixth position is selected.

The layers module 320 manages the application of layers to the reels by the player that impact the results of spins. In one embodiment, a layer is a data object that has a field for each position of one or more reels to which it is applied. A layer may be applied to a single reel or multiple reels. The content of each field defines how the corresponding position of a reel is modified by the layer. Examples of possible modifications performed by layers include replacing symbols of a first type with a second type, upgrading symbols of a specified type to a higher level, adding bonus points or other rewards to certain positions on the reel, changing the weights of the positions on the reel, and the like. It should be appreciated that a wide range of properties of the reels may be modified by applying layers. Additionally or alternatively, a layer may identify a symbol and instruct that any time that symbol appears, it is replaced by another symbol regardless of the position on the reel.

What layers are available to a player can be determined by various aspects of the current game state. For example, all players may start a match with a certain set of layers available and decide how to make optimal use of them throughout the match. Additionally or alternatively, layers may become available to a player based on gameplay. For example, layers may be added to reel positions as bonus objects that are earned if that position comes up or that are earned if the player achieves certain objectives, such their total score reaching a target or the score of a single spin exceeding a threshold.

In some embodiments, modifications made by layers may be absolute (e.g., this position will have a particular symbol) or conditional (e.g., if this position has a first symbol, replace it with a second symbol). Conditional field values enable layers to combine in interesting ways. For example, a first layer might cause a particular symbol to appear at a given position on a reel and a second layer that upgrades all instances of the particular symbol can then upgrade the symbol at the given position, even where it would not upgrade that position if the first layer had not been applied. Note that the effects of layers do not have to be positive. In some embodiments, a layer may add a mix of positive and negative effects (e.g., replacing a first type of low value symbol with a first type of high value symbol while also replacing a second type of high value symbol with a second type of low value symbol), further increasing the challenge to the players in determining how to effectively apply the layers in the optimal combination.

Layers are generally added in a particular order and are applied sequentially in that order. In one embodiment, layers are applied in the order that the player added them, meaning the first layer added is the first one applied. Alternatively, the reverse order may be used, with the most recently added layer being applied first. In another embodiment, the player may choose where in the order to add a new layer to apply it with the greatest effect.

Layers may also include metadata providing conditions for when the layer is removed. This may depend on the particular layer. Some layers may remain for the rest of a match once added. Others may last for a predetermined number of spins. Yet others may last until they are triggered. For example, a layer that adds bonus points to a particular position on a reel may last until that position on the reel is selected in a spin (earning the player the bonus points) or the end of the match, whichever comes sooner. After each spin, the layers module 320 may evaluate the metadata of all applied layers and remove layers as appropriate.

Figure 4:
FIG. 4 illustrates the application of a pair of layers to a set of reels in a slot machine game, according to one embodiment.

FIG. 4 conceptually illustrates how two (or more) layers may be stacked to impact the behavior of a reel, according to one embodiment. In the embodiment shown, a data object referred to as the default reel behavior 410 identifies three positions: position 1 411, position 2 412, and position 3 413. For each position, the data object includes identifiers of possible symbols that may be displayed and a default probability of each symbol being selected. The possible symbols and corresponding probabilities may be the same for each position or differ by position.

The default reel behavior 410 is modified by application of a first layer 420 followed by a second layer 430. Each layer is a data object that defines modifications to the default behavior. In the embodiment shown, the first layer 420 includes a first position 1 modifier 421, a first position 2 modifier 422, and a first position 3 modifier, which modify position 1, position 2, and position 3, respectively. Each modifier can change the probabilities associated with symbols as well as add, remove, or modify symbols that may be selected (which may in turn adjust the probabilities of other symbols being selected). For example, a modifier may identify the probability associated with a specific symbol in the default behavior and modify it, with the probabilities of other symbols being adjusted accordingly (e.g., using a normalization process). Some of the position modifiers may be blank, meaning that the first layer 420 does not impact the default reel behavior 410 for the corresponding position.

The second layer 430 includes a second position 1 modifier 431, a second position 2 modifier 432, and a second position 3 modifier 433. The second layer 430 behaves similarly to the first layer 420 in that each modifier can change the default behavior, except that changes made by the second layer 430 are stacked on top of changes made by the first layer 420. In stacking changes, modifiers may be absolute or relative. An absolute modifier in the second layer 430 overrides any corresponding changes made by the first layer 420. For example, if the first layer 420 set the probability of a symbol to 10% and the second layer sets the probability to 20%, the result is a probability of that symbol being selected of 20%. Conversely, a relative modifier modifies the previous value. For example, if the first layer 420 sets the probability of a symbol being selected to 10% and the second layer 430 increases the probability of that symbol being selected by 10%, the result is a probability of that symbol being selected of 11%.

The first layer 420 and the second layer 430 may also include metadata indicating when the layer expires, as described above. For example, the first layer 420 may apply until a particular symbol that it added to the reel is selected while the second layer 430 might last for the rest of a match. If the condition for a layer expiring is met, the layer is removed from the stacked layers and any necessary connections between positions and modifiers are reestablished. For example, if the first layer 420 is removed from the example shown in FIG. 4, connections may be established between the positions in the default reel behavior 410 data object and the corresponding modifiers in the second layer 430.

The modified reel behavior 440 represents the results of modifying the default reel behavior 410 with each of the layers. In the embodiment shown, the modified reel behavior 440 includes a modified position 1 field 441, a modified position 2 field 442, and a modified position 3 field 443. The modified position 1 field 441 represents the set of symbols and corresponding probabilities that result from applying the first position 1 modifier 421 and the second position 1 modifier 431 to the first position 411. Similarly, the modified position 2 field 442 and the modified position 3 field 443 represent the result of applying the layers to the second position 412 and the third position 413, respectively.

It should be appreciated that the use of these modular data objects (the layers) that are connected with the default reel behavior data object 410 enables a wide range of modifications to be made. Furthermore, the ability to apply multiple modifications in series enables potentially complex interactions to emerge. For example, one layer might multiply the value associated with a symbol on the reel while another might flip the value from positive to negative. Thus, while the first layer was initially a positive result for the player, the combination of the first and second layers makes the result worse for the player than if the second reel had been applied alone.

In another embodiment, the reels are defined by a circular, ordered list of "symbol type" enums as a base layer and the layers module 320 maintains a series of dictionaries to act as the override layers. The dictionaries may come in two forms: (1) a type-to-type translation (anytime type A appears, replace it with type B); and (2) a position-based translation such that individual slots on the reel can be replaced by symbols of an alternate type (e.g., at position 23, replace the cherry with a rank 2 star). These layers are typically a sparse set of replacements rather than one for one ordered lists. To render a reel, there is a visible window of ~3-7 positions which are queried to determine the symbols that should be shown. The stack of layers is then queried in priority order to see if the visible positions have any active overrides or adjustments at that position. Then the type-to-type replacements are queried to determine if the symbol type needs to be replaced with another. Once a final symbol type has been determined, a catalog (lookup table) is queried to instantiate a unique copy of that symbol type and all of its related data (image type, visual fx, audio cues, etc) so that it can be positioned on the screen relative to the reel position.

Referring back to FIG. 3, the modifications module 330 provides additional tools with which the players can modify the state of the game. These tools are distinct from the layers in that they generally do not impact the configuration of the reels. As with layers, the tools available to players may include an initial set of tools, tools earned through gameplay, or a combination of both. In one embodiment, the tools made available to players include one or more of: a nudge tool that lets the player move the position of a reel one or more positions (up, down, or in either direction), a peek tool that lets the player see symbols on the reel at positions that would otherwise be offscreen (e.g., to inform the player whether using a nudge is worthwhile), a hold tool that enables the player to prevent one or more reels from spinning when the next spin is initiated, an undo tool that enables the player to undo one or more prior actions, and the like. The tools provided by the modifications module 330 may also include global modifiers to the game state, such as score multipliers, modifications to the pay table, adding one or more additional reels, adding one or more additional pay lines, and the like.

The scoring module 340 determines the score earned by the player at the end of each game round and at the end of a match. The slot machine game includes a "pay table" that indicates combinations of symbols that award points. Thus, effective use of layers and other tools may enable a skilled player to drastically improve their score over what would be obtained by random spins alone. The scoring module 340 reports the score of the player to the server 110 and may also receive the on-going score of the other player or players in the match so the player can keep track of how they are performing. At the end of the match, the scoring module 340 may present the results of the match to the player (e.g., by causing a summary of the math to be displayed) and indicate any rewards earned.

At various points in a match, a player may trigger a bonus round or minigame. This may occur at the same time for all players or individually for a player when they meet one or more criteria. For example, a player may trigger a bonus round based on making selections for layers and use of other tools in less than a threshold amount of time, reaching a threshold total score, exceeding a threshold score in a single game round, etc. It should be appreciated that a wide range of conditions may be used to trigger bonus rounds and a wide range of bonus rounds may be included in the slot machine game to enable the player to earn additional points. For example, a bonus round may include one or more spins of a set of bonus reels with different symbols and layers applied than the main game. As another example, a bonus round may be an entirely different type of game, such as trivia or a short card game in which the player may earn points that are added to their total score. On completing a bonus round, gameplay will generally return to the main game with the reels in the same state as when the bonus round is triggered (possibly with some bonus applied that was earned in the bonus round, such as an upgrade to the value of one or more symbols).

EXAMPLE METHODS

Figure 5:
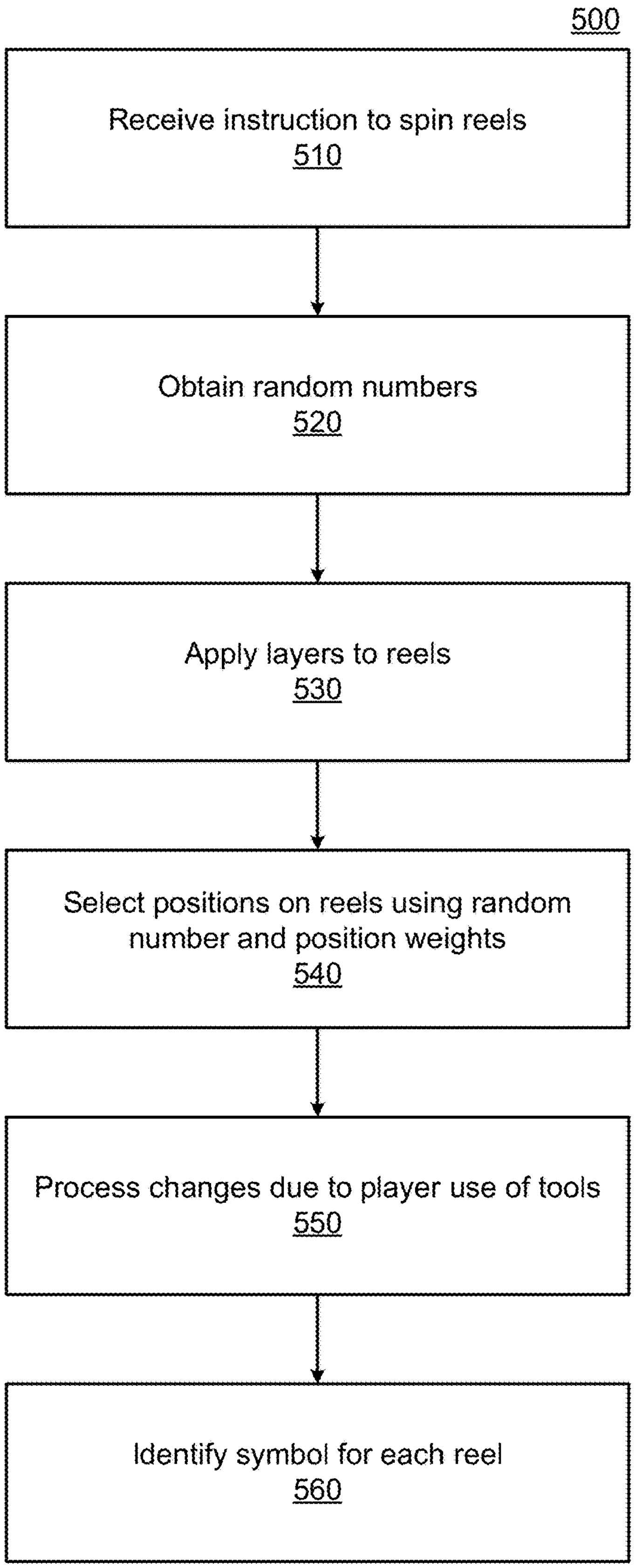
FIG. 5 is a flowchart of a method for performing a game round of a slot machine game using one or more layers, according to one embodiment.

FIG. 5 illustrates a method 500 for performing a game round of a slot machine game using one or more layers, according to one embodiment. The steps of FIG. 5 are illustrated from the perspective of the game module 310 performing the method 500. However, some or all of the steps may be performed by other entities or components. In addition, some embodiments may perform the steps in parallel, perform the steps in different orders, or perform different steps.

In the embodiment shown, the method 500 begins with the game module 310 receiving 510 an instruction to spin the reels (e.g., in response to the player selecting a "spin" button). The game module 310 obtains 520 one or more random (or pseudorandom) numbers and applies 530 any currently in effect layers to the reels. Alternatively, in embodiments where the layers cannot impact the weights of positions on the reels, the layers may not be applied 530 at this point, instead being applied 530 once a position has been selected 540 to modify the content of the selected position.

Regardless of whether the layers were applied 530, the game module 310 selects 540 a position on each reel using one or more random (or pseudorandom) numbers and the position weights. At this point in the game round, each reel is at a specific position and the symbol displayed at that position can be determined from the base configuration of the reels and the impact of any layers applied 530 to the reels that impact the displayed symbols (whether those layers were applied before or after the position was selected 540). The player may select one or more tools to use (e.g., nudges) that are processed 550 by the game module 310, resulting in a final position for each reel. The game module 310 identifies 560 a symbol for each reel based on the final position and any layers that are in effect. The identified 560 symbols can then be used to determine a score for the round for the player according to the pay table of the game and any score modifiers in effect.

Computing System Architecture

Figure 6:
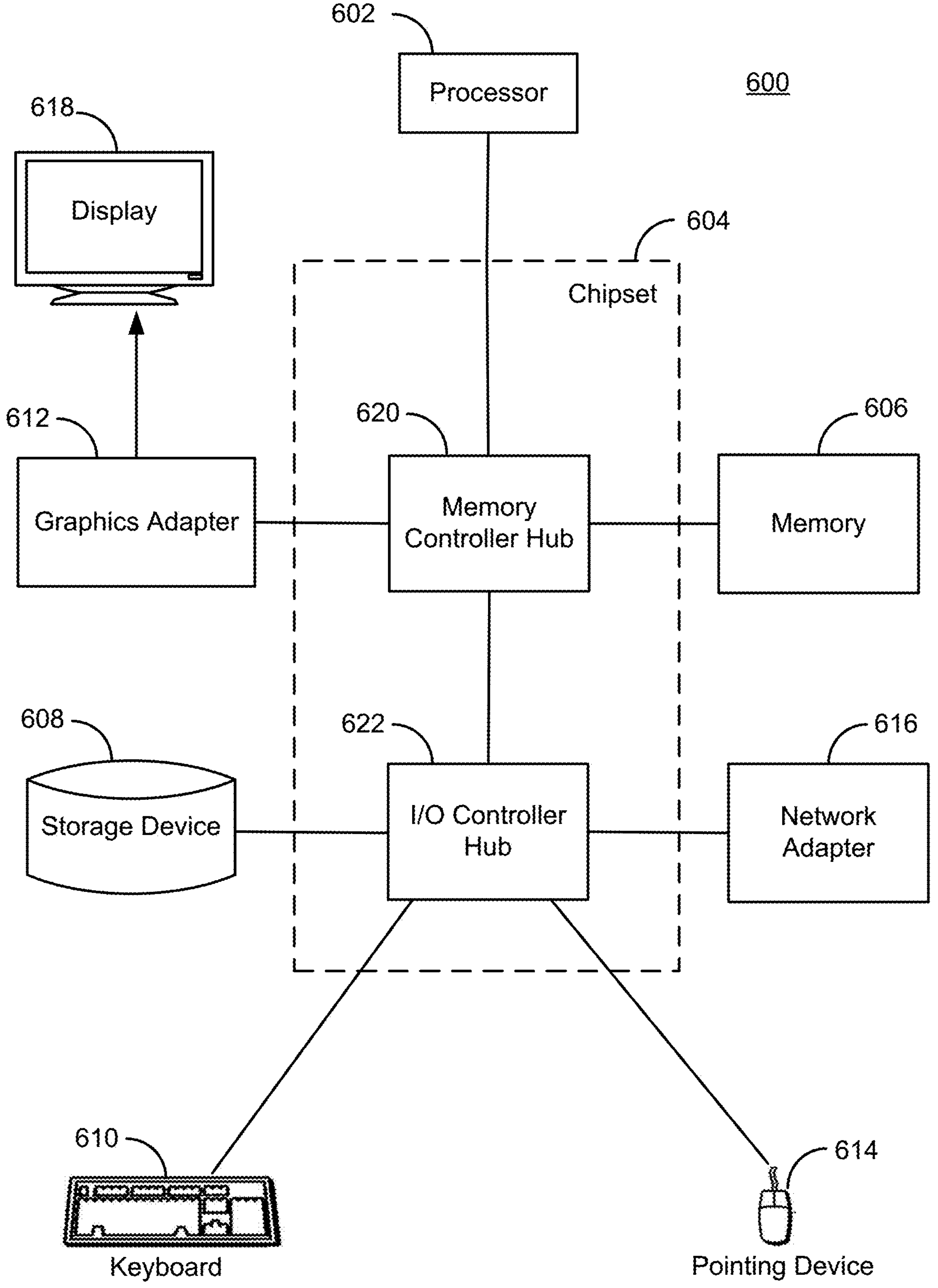
FIG. 6 is a block diagram illustrating an example of a computer suitable for use in the networked computing environment of FIG. 1, according to one embodiment.

FIG. 6 is a block diagram of an example computer 600 suitable for use as a server 110 or client device 140. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touchscreen, or other type of pointing device, and may be used in combination with the keyboard 610 (which may be an on-screen keyboard) to input data into the computer system 600. The graphics adapter 612 displays images and other information on the display 618. The network adapter 616 couples the computer system 600 to one or more computer networks, such as network 170.

The types of computers used by the entities of FIGS. 1 through 3 can vary depending upon the embodiment and the processing power required by the entity. For example, the server 110 might include multiple blade servers working together to provide the functionality described. Furthermore, the computers can lack some of the components described above, such as keyboards 610, graphics adapters 612, and displays 618.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. For example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for performing the same or similar functions as those disclosed above. Thus, while particular embodiments and applications have been illustrated and described, it is to be understood that the described subject matter is not limited to the precise construction and components disclosed. The scope of protection should be limited only by any claims that ultimately issue.

What is claimed is:

1. A method for selecting an item using a reel having a plurality of positions, the method comprising:
- accessing a default behavior for the reel, the default behavior having a first plurality of results corresponding to respective ones of the plurality of positions;
- applying a plurality of layers to the default behavior to determine modified behavior, the modified behavior having a second plurality of results corresponding to the respective ones of the plurality of positions, wherein each layer of the plurality of layers is a data object defining a modification of one or more of the first plurality of results, and wherein the plurality of layers are applied in a specified order according to a hierarchy;
- receiving an instruction to spin the reel to select a position of the plurality of positions, the instruction received after the applying of the plurality of layers to the default behavior to determine the modified behavior;
- obtaining a random number;
- selecting the position from the plurality of positions using the random number; and
- selecting a result corresponding to the position from the second plurality of results, the result indicating the item.

2. The method of claim 1, further comprising processing one or more changes that impact the selected position based on user selection of one or more tools.

3. The method of claim 2, wherein the one or more tools comprise at least one of: a nudge tool, a peek tool, a hold tool, or an undo tool.

4. The method of claim 1, wherein the plurality positions each have weights and the position is selected based on the weights, at least one of the plurality of weights being changed by the plurality of layers.

5. The method of claim 1, wherein the item is a symbol in a slot machine game.

6. The method of claim 5, wherein the modified behavior comprises at least one of: replacing symbols of a first type in the default behavior with a second type, upgrading symbols of a specified type in the default behavior to a higher level, adding a reward to a certain position of the plurality of positions, or changing weights of the positions relative to the default behavior.

7. The method of claim 1, wherein the reel is part of a slot machine game that is a skill-based game in which two or more players play head-to-head in a synchronized manner.

8. The method of claim 1, wherein a first layer of the plurality of layers is associated with metadata that indicate one or more conditions under which the first layer is removed from the reel.

9. The method of claim 8, wherein the one or more conditions include at least one of: a current match having ended, a number of spins for which the layer is applied, or the layer having been triggered.

10. The method of claim 8, further comprising:
- responsive to the one or more conditions for a first layer of the plurality of layers having been met, removing the first layer;
- establishing connections between a second layer of the plurality of layers and the default behavior; and
- determining updated modified behavior by applying the second layer to the default behavior.

11. The method of claim 1, wherein the plurality of layers includes a first layer defining a type-to-type translation and a second layer defining a position-based translation.

12. A non-transitory computer-readable medium comprising instructions for selecting an item using a reel having a plurality of positions, the instructions, when executed, causing a computing system to perform operations including:
- accessing a default behavior for the reel, the default behavior having a first plurality of results corresponding to respective ones of the plurality of positions;
- applying a plurality of layers to the default behavior to determine modified behavior, the modified behavior having a second plurality of results corresponding to the respective ones of the plurality of positions, wherein each layer of the plurality of layers is a data object defining a modification of one or more of the first plurality of results, and wherein the plurality of layers are applied in a specified order according to a hierarchy;
- receiving an instruction to spin the reel to select a position of the plurality of positions, the instruction received after the applying of the plurality of layers to the default behavior to determine the modified behavior;
- obtaining a random number;
- selecting the position from the plurality of positions using the random number; and
- selecting a result corresponding to the position from the second plurality of results, the result indicating the item.

13. The non-transitory computer-readable medium of claim 12, wherein the operations further include processing one or more changes that impact the selected position based on user selection of one or more tools.

14. The non-transitory computer-readable medium of claim 13, wherein the one or more tools comprise at least one of: a nudge tool, a peek tool, a hold tool, or an undo tool.

15. The non-transitory computer-readable medium of claim 12, wherein the plurality positions each have weights and the position is selected based on the weights, at least one of the plurality of weights being changed by the plurality of layers.

16. The non-transitory computer-readable medium of claim 12, wherein the item is a symbol in a slot machine game.

17. The non-transitory computer-readable medium of claim 16, wherein the modified behavior comprises at least one of: replacing symbols of a first type in the default behavior with a second type, upgrading symbols of a specified type in the default behavior to a higher level, adding a reward to a certain position of the plurality of positions, or changing weights of the positions relative to the default behavior.

18. The non-transitory computer-readable medium of claim 12, wherein the reel is part of a slot machine game that is a skill-based game in which two or more players play head-to-head in a synchronized manner.

19. The non-transitory computer-readable medium of claim 12, wherein a first layer of the plurality of layers is associated with metadata that indicate one or more conditions under which the first layer is removed from the reel.

20. A slot machine system comprising:

one or more processors; and a non-transitory computer-readable medium including instructions for selecting an item using a reel having a plurality of positions, the instructions, when executed by the one or more processors, causing the slot machine system to perform operations comprising:

accessing a default behavior for the reel, the default behavior having a first plurality of results corresponding to respective ones of the plurality of positions;

applying a plurality of layers to the default behavior to determine modified behavior, the modified behavior having a second plurality of results corresponding to the respective ones of the plurality of positions, wherein each layer of the plurality of layers is a data object defining a modification of one or more of the first plurality of results, and wherein the plurality of layers are applied in a specified order according to a hierarchy;

receiving an instruction to spin the reel to select a position of the plurality of positions, the instruction received after the applying of the plurality of layers to the default behavior to determine the modified behavior;

obtaining a random number;

selecting the position from the plurality of positions using the random number; and selecting a result corresponding to the position from the second plurality of results, the result indicating the item.

* * * * *